United States Patent
Choi et al.

(10) Patent No.: US 7,018,060 B2
(45) Date of Patent: Mar. 28, 2006

(54) LIGHT UNIT FOR DISPLAY DEVICE

(75) Inventors: Hark Lim Choi, Yongin (KR); Chan Soo Kim, Suwon (KR); Yong Joo Jo, Osan (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 245 days.

(21) Appl. No.: 10/611,906

(22) Filed: Jul. 3, 2003

(65) Prior Publication Data

US 2004/0240232 A1   Dec. 2, 2004

(30) Foreign Application Priority Data

Jun. 2, 2003   (KR) ................ 10-2003-0035269

(51) Int. Cl.
*F21V 7/04* (2006.01)

(52) U.S. Cl. ............................. 362/31; 362/26; 349/65
(58) Field of Classification Search ................ 362/26, 362/27, 31; 349/65
See application file for complete search history.

(56) References Cited

U.S. PATENT DOCUMENTS 6,020,944 A  *  2/2000  Hoshi .......................... 362/31

FOREIGN PATENT DOCUMENTS

JP         2002-124114         4/2002

* cited by examiner

*Primary Examiner*—Stephen F Husar
(74) *Attorney, Agent, or Firm*—Lowe Hauptman & Berner, LLP

(57) ABSTRACT

A light unit for a display device is used as a back light of an LCD panel and adapted to allow light entered from the side to exit in a perpendicular direction. The light unit includes a light source emitting white light; a light guide plate located at one side of the light source to transmit the light from the light source therethrough; a color dispersion sheet located opposite to the front surface of the light guide plate to refract the light transmitted through the light guide plate at different angles according to wavelength and to reflect the refracted light back into the light guide plate; and a diffraction pattern formed on at least one of the front surface and rear surface of the light guide plate to allow the light to pass through the color dispersion sheet to exit at the same angle.

11 Claims, 14 Drawing Sheets

LIGHT UNIT FOR DISPLAY DEVICE

BACKGROUND OF THE INVENTION

1. Field of the Invention

The present invention relates to a light unit for a display device, which is used as a back light of a liquid crystal display(LCD) panel and the like, and more particularly to a light unit for a display device, which is adapted to allow light entered thereinto from the side to exit in a direction perpendicular to the light unit.

2. Description of the Related Art

Currently, a liquid crystal display device(LCD) is widely used for monitors of personal computer monitors, flat televisions, or cellular phones, and the like. The liquid crystal display device requires a separate light source since it is not an independently light-generating device. Therefore, the liquid crystal display device is provided with a planar type light source, namely, a back light. Such a back light is configured to convert a linear shape light source, such as a cold cathode discharge tube, into such a planar type light source.

Considering various methods for constructing a light unit more specifically, there is one method for installing a light source under the rear surface of liquid crystal elements. Another method takes a side light manner for installing the light source at one side of the light guide plate of a light-transmitting type, such as an acrylic plate, and converting light emitting from the light source into planar light rays using the light guide plate, thereby achieving such a planar type light source. According to a further method, optical elements consisting of a prism array, and the like are installed at the light exiting surface of the light unit so as to achieve a desired optical property.

Among the above various methods, the method using the light guide plate installed at one side of the light source may utilize a multi-faceted prism 15 as shown in FIG. 1. FIG. 1 is a view illustrating a light unit of the prior art using such a prism.

As shown in FIG. 1, a light unit of the prior art comprises a light guide plate 13, a light source 10 installed at one side of the light guide plate 13 of a white light emitting type, a reflector plate 11 located under the light guide plate 13, and a diffuser sheet 14, multi-faceted prisms 15 and protective sheet 16 arranged in order above the light guide plate 13. Additionally, above the protective sheet 16, a liquid crystal display(LCD) panel 17 is disposed. The light guide plate 13 has a printed dot pattern or a V-shape groove pattern 18, as a dispersion pattern, at the lower portion thereof.

In operation, white light emitted from the light source 10 enters the light guide plate 13. After entered, the light exits from the light guide plate 13 at an angle at which it overcomes total reflection by virtue of the dispersion pattern formed at the light guide plate 13. After that, the exiting light becomes uniform in brightness by the diffuser sheet 14, and the prisms 15 gather the light to emit it frontward.

The light source 10 emits the white light of multi-wavelength, and the light guide plate 13 is formed at its upper portion with a certain diffraction pattern. Thus, when the white light enters the light guide plate 13, the incident rays of white light, such as Red, Green and Blue according to wavelength, are diffracted by the diffraction pattern of the light guide plate 13, thereby exiting from the light guide plate 13 at different diffraction angles according to wavelength. Due to a difference between the diffraction angles according to wavelength, the light is dispersed when it exits frontward, thereby causing a separation problem of white light into its component colors. This color separation phenomenon is well shown in FIG. 2. As shown in FIG. 2, light exiting angles of the rays R, G and B are not coincident with each other.

In order to solve the above problem, the light unit of the prior art shown in FIG. 1 adopts the diffuser sheet 14. Such a diffuser sheet 14 serves to increase the brightness uniformity of light so as to produce planar light rays of a uniform brightness. The diffuser sheet 14 is formed by randomly processing the surface of a film so that it can disperse light entered thereinto. That is, the diffuser sheet 14 is used to diffuse the light entered thereinto, thereby attenuating the color separation phenomenon of the light caused when the rays of different wavelengths exit at different angles.

The diffuser sheet 14 as described above, however, only functions to spread the light, thereby simply causing the rays of different wavelengths to overlap with each other. The diffuser sheet 14 cannot completely eliminate the color separation phenomenon of the light due to the different exit angles according to wavelength.

Further, since the light unit shown in FIG. 1 comprises the plural prisms and the diffuser sheet, the whole structure of the light unit is complex.

FIG. 3 is a view illustrating another light unit of the prior art, using a hologram pattern. Referring to FIG. 3, light emitting from a side light source 20 enters a light guide plate 21. The light guide plate 21 is formed with a hologram diffraction pattern 22. Such a hologram diffraction pattern 22 serves to cause the light proceeding through the light guide plate 21 to exit frontward from the light guide plate 21 at an angle of about 90°.

The light unit not using a prism as shown in FIG. 3 also suffers from the color separation phenomenon, similar to the case of FIG. 2. The light, to exit frontward from the light guide plate 21, is diffracted by the hologram diffraction pattern 22 formed at the upper portion of the light guide plate 21. As a result, the respective rays of light according to wavelength exit at different diffraction angles, thereby causing the exiting light to be dispersed into its several component colors according to wavelength.

Therefore, the light unit using the hologram diffraction pattern as shown in FIG. 3 requires a pattern design as shown in FIG. 4. FIG. 4 is a view illustrating a patterned surface of a light guide plate. The patterned surface comprises various different diffraction patterns corresponding to the respective wavelengths of light exiting from the light guide plate. That is, the patterned surface is divided into three kinds of regions for allowing the respective wavelengths R, G and B to exit in a direction perpendicular to the light guide plate, respectively. In this case, each of the regions is adapted to allow only one specific wavelength R, G or B to exit in a direction substantially perpendicular to the light guide plate, and these regions are continuously arranged, thereby preventing the user from recognizing the color separation phenomenon.

Such a continuous arrangement of different patterns on the light guide plate as stated above, however, complicates a manufacturing process, thereby deteriorating productivity. Furthermore, this arrangement of the hologram pattern is not an essential solution to the color separation problem.

SUMMARY OF THE INVENTION

Therefore, the present invention has been made in view of the above problems, and it is an object of the present invention to provide a light unit, which is provided with a color dispersion sheet for preventing the color separation phenomenon of light under a light guide plate, this color separation phenomenon being caused by differences between different diffraction angles of multi-wavelength light when the light entering from sideward exits frontward.

It is another object of the present invention to provide a back light unit of a liquid crystal display panel(LCD), which provides improved planar light rays, compared with the prior art.

It is yet another object of the present invention to provide a light unit capable of reduced thickness compared with the prior art by eliminating the use of optical elements, such as a diffuser sheet of the prior art used to change an optical path of light, thereby achieving a reduction in its whole size.

In accordance with the present invention, the above and other objects can be accomplished by the provision of a light unit for a display device comprising: a light source emitting multi-wavelength white light; a light guide plate located at one side of the light source, the light guide plate being adapted to transmit the light emitted from the light source therethrough; a color dispersion sheet located at an opposite surface to a front surface of the light guide plate, the color dispersion sheet being adapted to refract the light transmitted through the light guide plate at different angles according to wavelength and to reflect the refracted light back into the light guide plate; and a diffraction pattern formed on at least one of the front surface and a rear surface of the light guide plate, the diffraction pattern being adapted to allow rays of the light proceeding at the different angles according to wavelength through the color dispersion sheet to exit at the same angle.

Preferably, the color dispersion sheet may comprise an inclined surface, into which the light passing through the light guide plate enters at an incident angle satisfying the following Equation, $$\sin \alpha = -m\lambda/nd$$

wherein,

α: an angle defined between the light passing through the light guide plate and a line perpendicular to a light exit surface(namely, an incident angle)

m: order( . . . ,−1, 0, 1, 2, 3, . . . )

λ: wavelength d: a pitch of a diffraction pattern formed at the light guide plate n: a refractive index of the light guide plate Preferably, the color dispersion sheet may have a sectional shape formed by repeatedly arranging a plurality of triangular projections at constant pitches, and the pitch of the color dispersion sheet may be in a range between 0.5 mm and 2.0 mm.

Preferably, the light enters and exits to and from the color dispersion sheet through the same surface or different surfaces, respectively.

Preferably, the diffraction pattern may be a hologram diffraction pattern obtained through a hologram exposure process, and the light unit may further comprise an optical path correcting member located between the light source and light guide plate, the optical path correcting member being adapted to allow an optical path of the light entering the light guide plate to be inclined at a certain angle from the light guide plate and a horizontal plane.

Preferably, a refractive index n of the color dispersion sheet may larger than 1.0 and smaller than 1.8, and the color dispersion sheet may be made of transparent synthetic resin.

Preferably, the color dispersion sheet may be made of an optical medium having a refractive index of a flint series.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
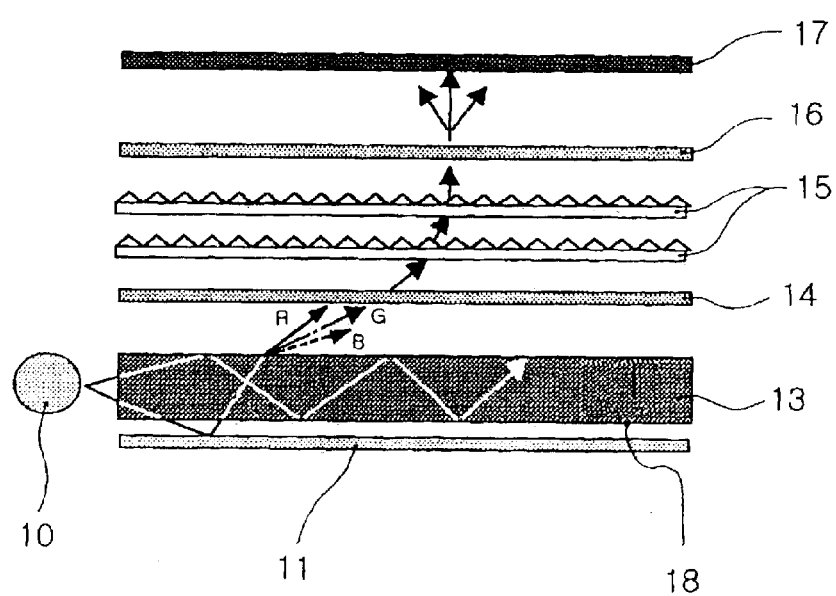
FIG. 1 is a view illustrating a light unit of the prior art, using prisms.
Figure 2:
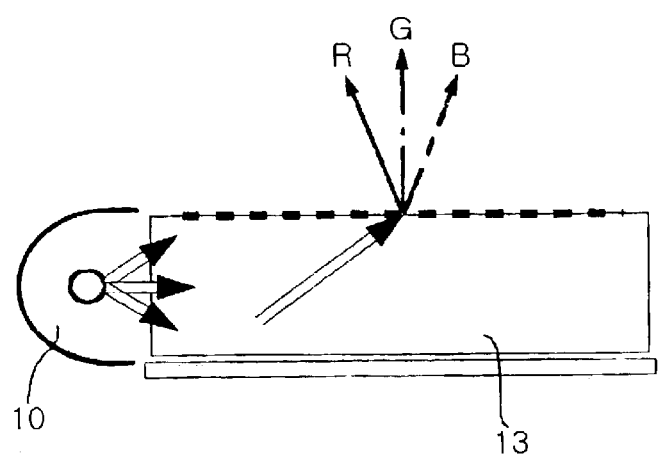
FIG. 2 is a view illustrating color separation phenomenon of light exiting from a light guide plate.
Figure 3:
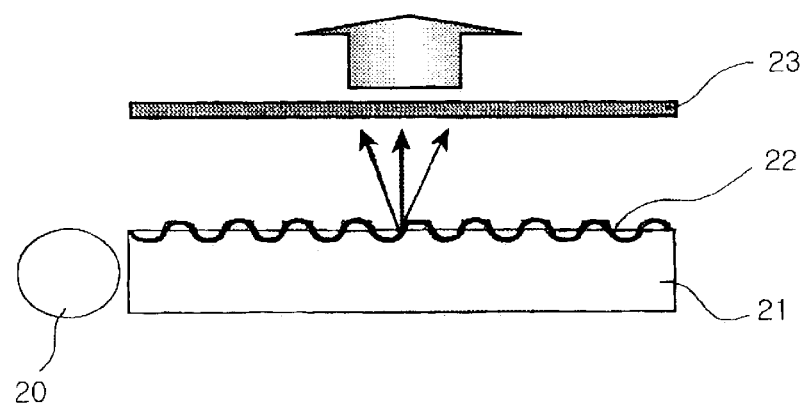
FIG. 3 is a view illustrating another light unit of the prior art, using a hologram pattern.
Figure 4:
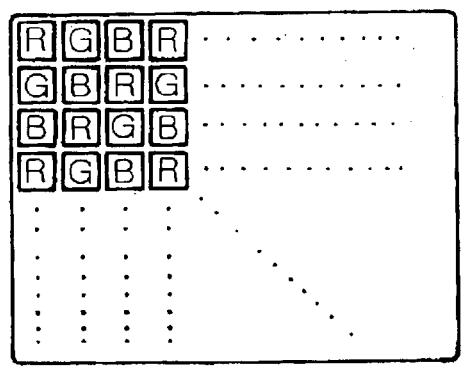
FIG. 4 is a view illustrating a hologram patterned surface, to be used in the light unit shown in FIG. 3.
Figure 5:
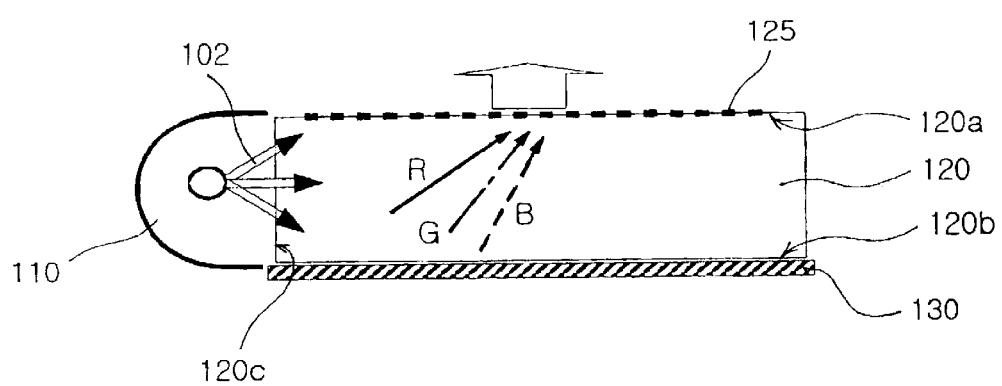
FIG. 5 is a sectional view illustrating a light unit for a display device, in accordance with the present invention.

FIG. 5 is a sectional view illustrating a light unit for a display device in accordance with the present invention, the light unit comprising a light guide plate, a light source installed at one side of the light guide plate, a color dispersion sheet located at the bottom surface of the light guide plate, and a diffraction pattern formed at the light guide plate.

[Light Source]

As shown in FIG. 5, a light unit of the present invention comprises a light guide plate 120 made of a light-transmitting flat plate, and a light source 110 disposed at one side of the light guide plate 120. The light source 110 emits white light of multi-wavelength, and has a linear shape. A fluorescent tube or light emitting diode(LED) array may be used as the light source 110, but is not limited thereto. Preferably, a cold cathode tube, having a high luminosity and enabling a reduction in size of the light source, may be used.

[Light Guide Plate]

The light guide plate 120, located at one side of the light source 110, comprises a front surface 120a and a rear surface 120b, and an incident side surface 120c therebetween. The front surface 120a faces an observer, and the rear surface 120b is opposite to the observer. The incident side surface 120c is positioned adjacent to the light source 110.

The light guide plate 120 is a rectangular thin plate able to transmit the light therethrough, and may be made of a suitable material showing transparency according to a wavelength range of the light source. For example, a material suitable for use in a visible light region is transparent resin or glass, and the like. The transparent resin includes acrylic resin, polycarbonate resin or epoxy resin, and the like. The light guide plate 120 may be formed using a cutting method, and the like.

The front surface 120a or rear surface 120b of the light guide plate 120 is formed with a diffraction pattern 125. The diffraction pattern functions to cause a light 102 emitting from the light source 110 which enters the side surface 120c of the light guide plate 120 to exit in a direction substantially perpendicular to the front surface 120a, namely, the light exit surface of the light guide plate 120.

[Diffraction Pattern]

The diffraction pattern 125 is formed at the front surface 120a or the rear surface 120b of the light guide plate 120. The diffraction pattern formed at the light guide plate, preferably, is a hologram pattern obtained through a hologram exposure process. Such a hologram pattern is one of diffraction patterns functioning to diffract light entering thereinto. The use of such a hologram diffraction pattern enables the light passing therethrough to be adjusted to have a desired light exiting angle. This is a new effect not achievable by a conventional diffraction grating consisting of gaps. The conventional diffraction grating is adapted only to wholly transmit the incident rays of light through the gaps, and to wholly absorb the incident rays of light at remaining blocked portions except the gaps. The shape and pitch of the hologram diffraction pattern may be arbitrarily adjusted in order to achieve a desired diffraction angle according to wavelength of light entering thereinto. The relationship between the pitch of the hologram diffraction pattern and the light entering the pattern will be described later.

The hologram diffraction grating of the present invention is formed by carving a plurality of parallel lines into a planar glass plate or concave metal plate with equal spacings therebetween. After the light enters the hologram diffraction grating, the light transmitted therethrough or reflected therefrom is divided into a plurality of light rays according to wavelength of the light, thereby allowing a spectrum to be obtained. The divided rays of the light entered into the diffraction grating of the planar glass plate, through the parallel lines, are absorbed or dispersed, whereas ones entered through narrow gaps between the lines pass through the diffraction grating. The passed light beams, however, are diffracted according to Huygens' principle without going straight, thereby spreading out in a cylindrical shape.

Holograms are classified into reflective holograms and transmissive holograms according to a reproduction manner thereof. In the reproduction of the transmissive hologram, the light enters from the rear side of the hologram to be transmitted through it, thereby allowing an image transmitting the hologram to be observed from in front of the hologram. The present invention utilizes such a transmissive hologram pattern adapted to transmit the light frontward through a reflector plate located at the rear side of the hologram pattern. On the other hand, in the reproduction of the reflective hologram, the light enters from the front side of the hologram pattern to be reflected therefrom, thereby allowing an image reflected at the hologram to be observed from in front of the hologram.

In conventional cases, a diffraction grating on a light guide plate is manufactured by vacuum depositing aluminum on a highly-processed glass plate, and mechanically drawing lines on the aluminum with a diamond. This manufacturing method, however, has several problems in that it requires a long time, the formed lines are easily curved, and distances between the lines are irregular.

On the other hand, in the case of a diffraction grating manufactured using a holography method, it is possible for the distances between gratings to be considerably reduced, to achieve a high resolving power up to 10000 lines per 1 mm depending on a kind of photosensitive materials, and to simplify the whole process thereof.

Figure 12:
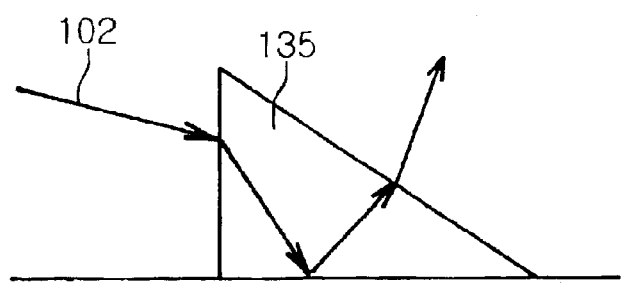
FIG. 12 is a view illustrating an optical path of the color dispersion sheet of the light unit shown in FIG. 11.
Figure 13:
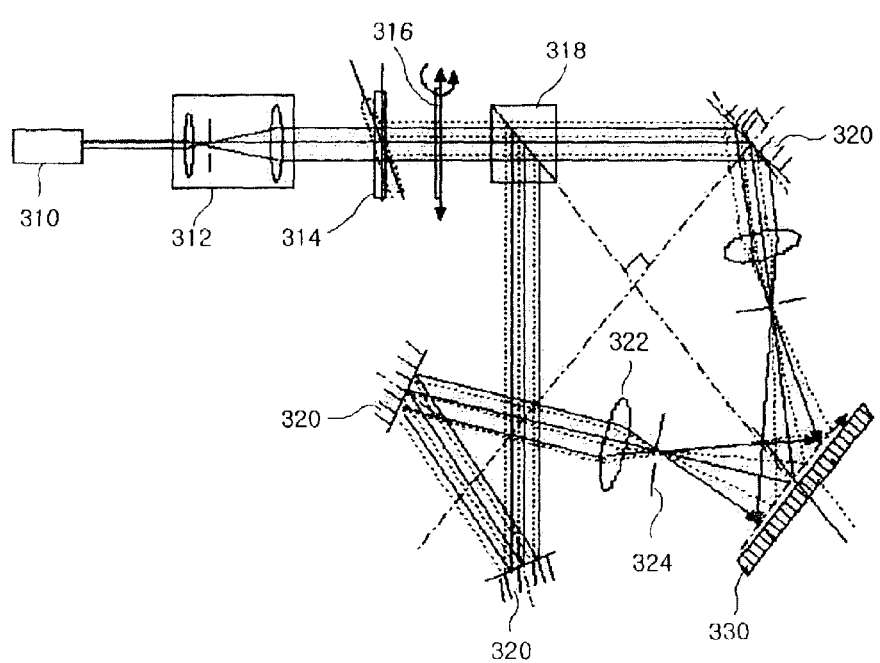
FIG. 13 is a view illustrating one example of a process for forming a diffraction pattern, to be formed at a light guide plate of the light unit according to the present invention.

In order to achieve the diffraction pattern as described above, a hologram exposure process as shown in FIG. 13 may be used. According to the hologram exposure process, after exposing a photo-resistor to laser light using a coherence property, it is developed and reproduced by a stamper, thereby achieving a mass production of the hologram pattern. That is, as shown in FIG. 12, the laser light emitted from a laser 310 passes a diffuser 312 and drives 314 and 316 in order. These drives 314 and 316 are driven in x-axis and y-axis directions, respectively, for the successive exposure of the pattern to the laser light. The laser light is also split into a reference light and an object light via a light spliter 318. After passing through the light split 319, the split light rays are differentiated from each other in their optical paths by a reflector mirror 320, thereby generating a phase difference between the two light rays. A special filter consisting of an object lens 322, a pin hole 324 and the like serves to eliminate noise of the light rays, thereby achieving uniform diffused light. Such an obtained diffused light is irradiated to a glass plate 330 uniformly coated with a photo-resistor. In this case, a pitch of the obtained diffraction pattern depends on a phase coherence of the two light rays. That is, the pitch is adjusted according to an angle defined between the two incident rays. In addition, a depth of the pattern can be adjusted according to an exposure amount of a specific wavelength and a reactivity of a photosensitive material.

[Color Dispersion Sheet]

The light unit of the present invention comprises a color dispersion sheet 130 coming into contact with the rear surface 120b of the light guide plate 120. The color dispersion sheet 130 is adapted to refract the light, entered thereinto after passing through the light guide plate 120, at different angles according to wavelength, and then to again reflect the refracted light back into the light guide plate 120 such that the light continues to pass through the light guide plate 120. Such a color dispersion sheet is also made of a light-transmitting material, such as glass, transparent synthetic resin and the like.

Alternatively, the color dispersion sheet may be made of an optical medium having a specific index of refraction of a flint series. Such a flint series medium has a high refractive index as well as a low distribution constant, thereby causing a large amount of dispersion. Therefore, in order to increase the color dispersion efficiency thereof, the use of the flint series is preferable.

A refractive index of the color dispersion sheet 130 is determined according to the shape of the color dispersion sheet and an angle of the light entering thereinto. In particular, a material constituting the color dispersion sheet must have a refractive index as close as possible to that of an incident medium and a high color dispersion ability. Preferable, the refractive index n is larger than 1.0 and smaller than 1.8.

Figure 6:
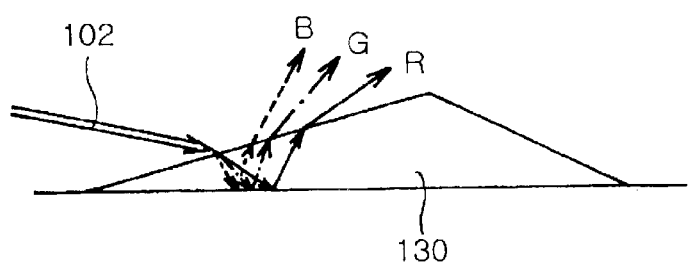
FIG. 6 is a sectional view illustrating a color dispersion sheet, to be used in the light unit shown in FIG. 5.
Figure 10:
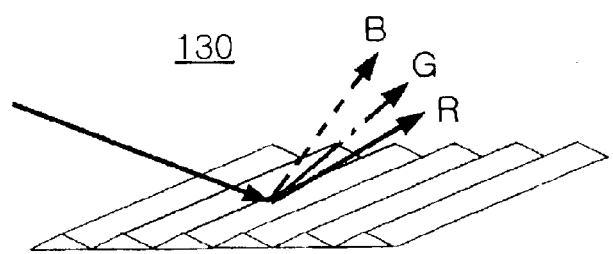
FIG. 10 is a perspective view illustrating one embodiment of the color dispersion sheet of the light unit of the present invention.
Figure 11:
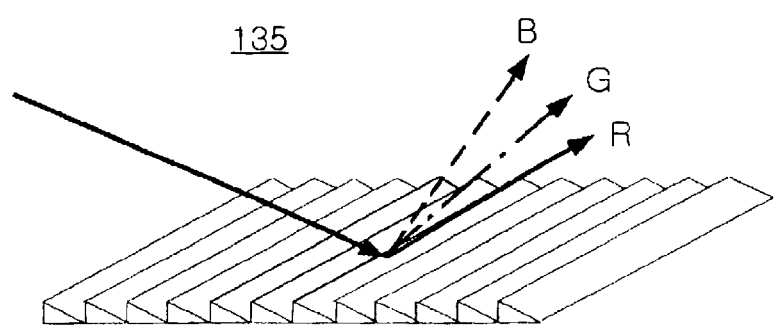
FIG. 11 is a perspective view illustrating another modified embodiment of the color dispersion sheet of the light unit of the present invention.

The color dispersion sheet 130 is formed by repeatedly arranging a certain triangular section as shown in FIG. 6. That is, the color dispersion sheet 130 comprises a plurality of projections having a triangular sectional shape of a certain pitch. Referring to FIG. 10, the light entering surface of the color dispersion sheet is an inclined surface. Referring to FIG. 11, the light entering surface of the color dispersion sheet is a vertical surface. Hereinafter, the color dispersion sheet shown in FIG. 10 will be explained in detail.

[Color Dispersion Sheet-Optical Path]

Referring to FIG. 6, the light 102 emitting from the light source 110 which proceeds through the light guide plate 120 enters the inclined surface of the color dispersion sheet 130. As stated above, the light 102 is of a multi-wavelength type. When the light 102 enters the color dispersion sheet 130, red, blue and green components R, B and G of the light 102 according to wavelength enter at the same incident angle.

After entering the color dispersion sheet 130, the red, blue and green light components of the light 102 are refracted at different angles according to wavelength, respectively, within the color dispersion sheet 130. As a result, when the refracted light exits the color dispersion sheet 130 to again enter the light guide plate 120, differences between the light exiting angles according to wavelength of the light are increased.

[Color Dispersion Sheet-Refraction]

Figure 7:
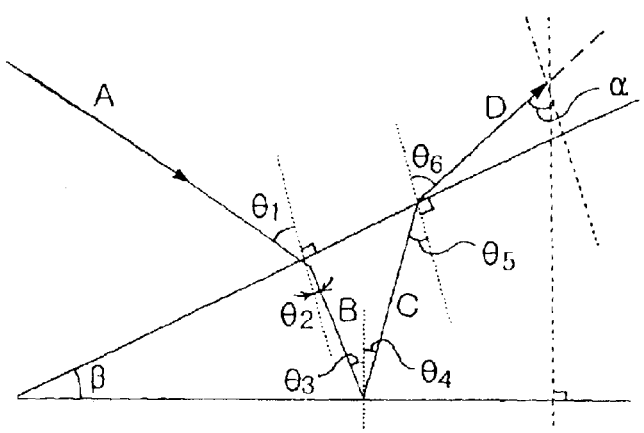
FIG. 7 is a view illustrating optical paths related with the color dispersion sheet shown in FIG. 6.

FIG. 7 is a view illustrating an optical path in the color dispersion sheet 130 shown in FIG. 6. Referring to FIG. 7, the light passing through the light guide plate enters the color dispersion sheet along an optical path A. At this time, the light enters at an incident angle $\theta_1$. The entered light inside the color dispersion sheet is refracted at a refraction angle $\theta_2$, thereby proceeding along an optical path B. Then, the refracted light is reflected at the bottom of the color separation sheet, thereby proceeding along an optical path C. At this time, the reflected light has reflection angles of $\theta_3$ and $\theta_4$, on the basis of a line perpendicular to the bottom surface of the color dispersion sheet. The light having passed the color dispersion sheet reaches the inclined surface of the color dispersion sheet at an incident angle of $\theta_5$, and, at the same time, leaves the inclined surface of the color dispersion sheet at an exit angle of $\theta_6$.

In addition, the light, emerging from the color dispersion sheet which passes through the light guide plate, enters the diffraction pattern formed at the light guide plate at an incident angle of $\alpha$. Also, an angle defined between the inclined surface of the color dispersion sheet and horizontal plane is denoted as $\beta$.

Now, the relationship between the above angles is considered.

First, where the light exiting from a first medium enters a second different medium having a different refractive index from that of the first medium, an incident angle and an exit angle of the light satisfy the following Equation 1.

$$n_{12} = \sin \theta_e / \sin \theta_i \qquad \text{Equation 1}$$

wherein, $n_1$ is a refractive index of the second medium to which the light enters, $n_2$ is a refractive index of the first medium from which the light exits, $\theta_e$ is an exit angle of the light, and $\theta_i$ is an incident angle of the light.

As stated above, the light proceeding along the optical path A enters the inclined surface of the color dispersion sheet at the angle of $\theta_1$, and exits from the light guide plate toward the color dispersion sheet at the angle of $\theta_2$. In this state, if a refractive index of air, namely, the refractive index $n_1$, containing the optical path A is 1, and a refractive index of the color dispersion sheet, namely, the refractive index $n_2$ is n, they satisfy the following Equation 2 according to Snell's Law.

$$n_1 \sin \theta_1 = n_2 \sin \theta_2, \text{ and consequently } \sin \theta_1 = n \sin \theta_2 \qquad \text{Equation 2}$$

Considering optical geometric conditions inside the color dispersion sheet, the relationship between the above angles is described by the following Equations.

$$\theta_5 = \theta_2 + 2\beta \qquad \text{Equation 3}$$

$$\alpha = \theta_6 - \beta \qquad \text{Equation 4}$$

Again, the light, proceeding along an optical path D, exits the color dispersion sheet at an exit angle obtained by the following Equation 5.

$$\sin \theta_6 = n \sin \theta_5 \qquad \text{Equation 5}$$

From the above Equations 2 to 5, a relationship between the angles $\alpha$, $\beta$, and $\theta_1$ can be given as the following Equation 6.

$$\alpha = \sin^{-1}[n \sin [\sin^{-1}[(1/n)\sin \theta_1] + 2\beta]] - \beta \qquad \text{Equation 6}$$

If an incident angle $\theta_1$ of the light entering the color dispersion sheet is determined, by adjusting an inclination angle $\beta$ of the inclined surface formed at the color dispersion sheet, it is possible to determine an incident angle $\alpha$ of the light entering the diffraction pattern formed at the top surface of the light guide plate.

Where the light again enters the light guide plate via the color dispersion sheet, the respective components of the light according to wavelength are divided in their optical paths, thereby entering the light guide plate at different angles from each other. That is, as can be seen from the above Equation 6, an index of refraction is different according to wavelength, and thus the exit angles of red, green and blue components of the light according to wavelength are differentiated at an angle of around 10°, on the basis of the light component having a wavelength G.

The present invention is characterized in the utilization of color dispersion phenomenon, which is caused in the color dispersion sheet, due to differences between the refractive indexes of light components according to wavelength. In this way, the light exiting from the color dispersion sheet proceeds inside the light guide plate under a state wherein the respective light components according to wavelength are separated.

[Diffraction of Light According to Wavelength]

Figure 8:
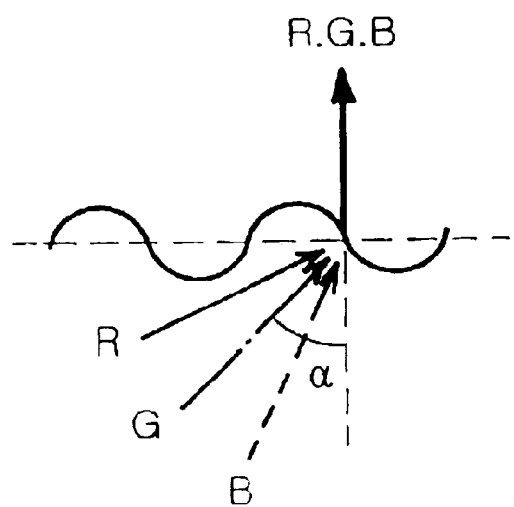
FIG. 8 is a view illustrating light exiting in a direction perpendicular to a light guide plate.
Figure 9:
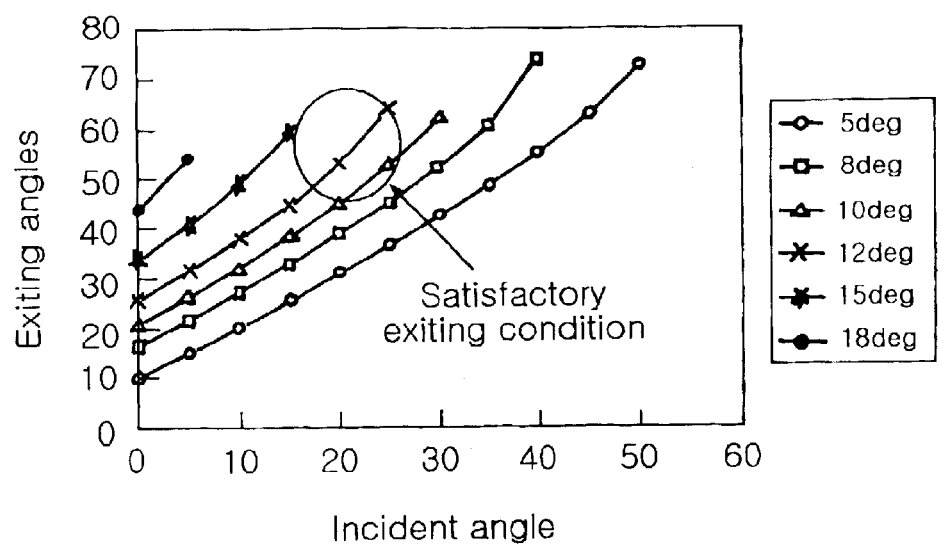
FIG. 9 is a graph illustrating the distribution of exit angles of light corresponding to incident angles of the light to the color dispersion sheet shown in FIG. 6.

An incident angle of the light entering the diffraction pattern formed at the top surface of the light guide plate and an exit angle of the light exiting from the diffraction pattern have a relationship as follows (see FIG. 8).

$$P = m\lambda / (\sin \theta_r - \sin \alpha) \qquad \text{Equation 7}$$

wherein,

P is a pitch of the diffraction pattern, m is a diffraction order, $\lambda$ is a wavelength, $\theta_r$ is an exit angle, and
$\theta_i$ is an incident angle.

When the light passes through the light guide plate prior to entering the color dispersion sheet or upon exiting from it, the light passes an air layer. In this case, as a difference between the refractive index of the light guide plate and the refractive index of a contiguous medium, namely the air, becomes smaller, a difference range between a prism angle and an incident angle becomes wider, as can be seen from the above Equations.

Therefore, taken-into account the Equation 7, in order to allow the light entering the light guide plate to exit at an angle of substantially 0°, that is, in order to manufacture a pitch of the diffraction grating for allowing the light to exit in a direction perpendicular to the inclined surface of the light guide plate, the following Equation should be satisfied.

$$P = m\lambda/(-\sin \alpha) \quad \text{Equation 8}$$

In the Equation 8, the incident angle α of the diffraction pattern is determined through the Equation 6. In this case, the incident angle α is varied according to the wavelength λ.

Therefore, as can be seen from the Equations 6 and 8, an incident angle α of the light according to wavelength, entering the diffraction pattern formed at the light guide plate, is determined according to the inclination angle β of the inclined surface of the color dispersion sheet. In addition, from the incident angle α and the wavelength λ, it is possible to determine the pitch P of the diffraction pattern.

By the virtue of the pitch of the diffraction pattern determined through the above-described Equations, all of the wavelengths of light can exit in a direction substantially perpendicular to the light guide plate.

Such a result is obtained by assuming that the hologram pattern is formed at the rear surface of the light guide plate. In this case, the light exits from the color dispersion sheet toward the air, and again enters the hologram pattern formed at the rear surface of the light guide plate, thereby being diffracted thereon.

Where the hologram pattern is formed at the top surface of the light guide plate, in particular, a refractive index of the light, again entering the light guide plate after exiting toward the air via the color dispersion sheet, should be considered. Such a refractive index can be obtained by applying Snell's law as stated above. In addition, according to the respective refractive indexes of the light guide plate and air, it is possible to achieve an incident angle of the light entering the top surface of the light guide plate after passing through the light guide plate.

[Embodiment]

Now, the pitch of the hologram diffraction grating provided in the light unit of the present invention is determined, and an effect of color dispersion phenomenon according to the obtained pitch is explained.

TABLE 1

| Incident angle of color dispersion sheet | Inclination angle | | | | | |
|---|---|---|---|---|---|---|
| | 5 deg | 8 deg | 10 deg. | 12 deg | 15 deg | 18 deg |
| 0 | 10.09808661 | 16.42212314 | 20.86588247 | 25.59709298 | 33.59037789 | 43.845432 |
| 5 | 15.23453801 | 21.77115273 | 26.44587013 | 31.52689166 | 40.50868099 | 53.93379259 |
| 10 | 20.45049458 | 27.28174293 | 32.28019476 | 37.8748399 | 48.55228525 | |
| 15 | 25.76063282 | 32.99913457 | 38.46457192 | 44.86628674 | 59.34308515 | |
| 20 | 31.1878826 | 38.99848202 | 45.17596932 | 53.02397107 | | |
| 25 | 36.76815715 | 45.41305771 | 52.79521518 | 64.28089656 | | |
| 30 | 42.55958189 | 52.50991946 | 62.46552366 | | | |
| 35 | 48.66241677 | 60.96986825 | | | | |
| 40 | 55.26939067 | 74.50532691 | | | | |
| 45 | 62.83165389 | | | | | |
| 50 | 73.05602987 | | | | | |

The Table 1 shows relationships between the incident angle and exit angle of the color dispersion sheet and the incident angle to the diffraction pattern.

As can be seen from the Table 1, when the pitch of the hologram diffraction pattern on the light guide plate is 0.45 μm, the incident angle to the diffraction pattern has to be 55° in order to optimize the distribution of the light exiting frontward. Especially, when the inclination angle β of the inclined surface of the color dispersion sheet is set at 12°, it is possible to achieve optimal distribution of exiting light. In this case, the incident angle of the light entering the color dispersion sheet is in a range between 15° and 25°, and such a range of the light can be appropriately dispersed.

Actually calculated refractive indexes and incident angles α of the light having a different wavelength, conforming to the above conditions, are shown in the following Table 2. As shown in the Table 2, when a difference between the refractive indexes of the air and color dispersion sheet is 0.04, exit angles of the red, green and blue components according to wavelengths exiting from the color dispersion sheet vary about 3° from each other.

TABLE 2

| | Index of refraction | Angle |
|---|---|---|
| R(640 nm) | 1.51 | 53.59 |
| B(450 nm) | 1.55 | 56.02 |

[Shape]

FIG. 10 is a perspective view illustrating one embodiment of the color dispersion sheet provided in the light unit of the present invention, in which the shape of the color dispersion sheet 130 as stated above is shown. Referring to FIG. 10, the color dispersion sheet is inclined at its certain surface through which the light enters, and a distance between the inclined surfaces, namely, a pitch, is in a range between 0.5 mm and 2.0 mm. The color dispersion sheet 130 comprises a plurality of triangular sectional projections, and a maximum height of the projection is in a range between 0.1 mm and 0.5 mm.

As stated above, the pitch is at least 0.5 mm. If the pitch is smaller than 0.5 mm, the triangular projection of the color dispersion sheet becomes thinner, thereby causing the optical path inside the color dispersion sheet to be shortened. This shortened optical path deteriorates the color dispersion effect of the sheet. On the other hand, if the pitch is larger than 2.0 mm, a thickness of the color dispersion sheet becomes thicker, thereby increasing the whole thickness of the light unit. Therefore, it is preferable to limit the range of the pitch as stated above.

In the case of the color dispersion sheet shaped as shown in FIG. 10, the optical path inside the color dispersion sheet is the same as described above. Such a color dispersion sheet is characterized in that the light entering surface of the sheet coincides with light exiting surface thereof. That is, the light enters and exits through the same surface of the color dispersion sheet.

FIG. 11 is a perspective view illustrating another color dispersion sheet, which is designated by reference numeral 135 and configured so that the light enters and exits through different respective surfaces of the sheet. The color dispersion sheet 135 shown in FIG. 11 also comprises a plurality of projections having a triangular section, and the pitch and depth of the projections are selected in the same manner as FIG. 10.

Exceptionally, the color dispersion sheet 135 shown in FIG. 11 has a vertical surface as a light entering surface, and an inclined surface as a light exiting surface. That is, the light enters and exits through different surfaces, respectively.

FIG. 12 is a view illustrating an optical path inside the color dispersion sheet 135 shown in FIG. 11. As shown in FIG. 12, the light 102 enters the vertical surface of the color dispersion sheet 135 at a certain angle from a horizontal plane. The entered light is refracted inside the color dispersion sheet and then is reflected at the bottom thereof. Again, the reflected light enters the light guide plate after exiting from the inclined surface of the color dispersion sheet. The color dispersion effect as stated above is also generated, thereby allowing the light to enter the diffraction pattern of the light guide plate at different angles according to wavelength so as to exit therefrom in a substantially perpendicular direction to the light guide plate.

Such a configuration of the color dispersion sheet 135, formed with the vertical surface so as to form the optical path as shown in FIG. 12, also improves the transmission efficiency of the light entering the color dispersion sheet. That is, since the light source is located at one side of the light guide plate, the optical path extends close to the horizontal plane. This enables a large amount of light to enter the color dispersion sheet.

[Optical Path Correcting Member]

Figure 14:
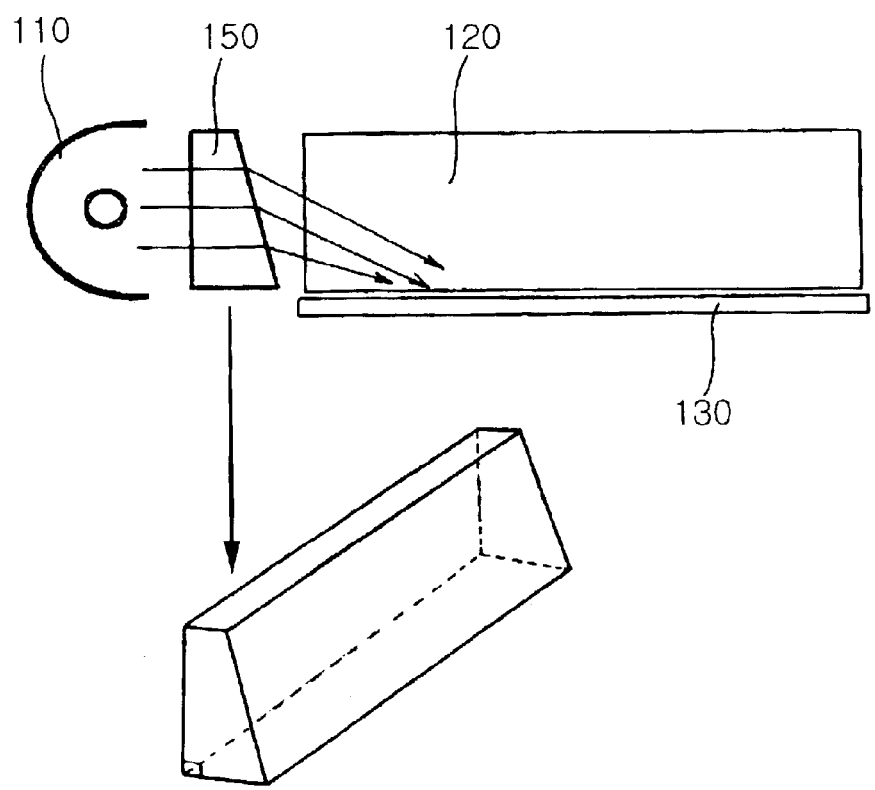
FIG. 14 is a view illustrating an installed state of an optical path correcting member provided in the light unit of the present invention.

The light unit of the present invention, preferably, may be provided with an optical path correcting member 150 between the light source 110 and light guide plate 120, as shown in FIG. 14. The optical path correcting member 150 serves to correct the horizontal path of the light emitting from the light source to be inclined downward toward the color dispersion sheet 130. For this, the optical path correcting member 150 is vertical at its one surface facing the light source 110, and is inclined at its another surface facing the light guide plate. The optical path correcting member may be made of a light-transmitting material like the light guide plate, and the refractive index and shape thereof are determined in consideration of the shape of the color dispersion sheet.

If the optical path is adjusted using the optical path correcting member, especially, in the case of the color dispersion sheet 130 as shown in FIG. 10, the light enters the color dispersion sheet at an angle substantially perpendicular thereto. This increases a density of the light entering the color dispersion sheet. Therefore, it is possible to refract a larger amount of light inside the color dispersion sheet, thereby facilitating the color dispersion of the light, and increasing the amount of the light to be dispersed according to wavelength.

As apparent from the above description, the present invention prevents the occurrence of color separation phenomenon by installing a color dispersion sheet at the bottom surface of a light guide plate, the color separation phenomenon being caused by differences between diffraction angles of light according to wavelength when the multi-wavelength light entering from the side exits frontward.

Further, according to the present invention, it is possible to provide a back light unit of a liquid crystal display(LCD) panel, which can offer an improved planar type light source compared with the prior art by preventing the color separation phenomenon, and can eliminate the use of optical elements, such as a conventional diffuser plate, thereby achieving a reduction in thickness of a product compared in a conventional light unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A light unit for a display device comprising:
   a light source emitting multi-wavelength white light;
   a light guide plate located at one side of the light source, the light guide plate being adapted to transmit the light emitted from the light source therethrough;
   a color dispersion sheet located at an opposite surface to a front surface of the light guide plate, the color dispersion sheet being adapted to refract the light transmitted through the light guide plate at different angles according to wavelength and to reflect the refracted light back into the light guide plate; and
   a diffraction pattern formed on at least one of the front surface and a rear surface of the light guide plate, the diffraction pattern being adapted to allow rays of the light proceeding at the different angles according to wavelength through the color dispersion sheet to exit at the same angle.

2. The light unit for a display device as set forth in claim 1, wherein the color dispersion sheet comprises an inclined surface, into which the light passing through the light guide plate enters at an incident angle satisfying the following Equation, $$\sin \alpha = -m\lambda/nd$$

wherein,
   $\alpha$: an angle defined between the light passing through the light guide plate and a line perpendicular to a light exit surface (namely, an incident angle)
   m: order ( . . . , −1, 0, 1, 2, 3, . . . )
   $\lambda$: wavelength
   d: a pitch of a diffraction pattern formed at the light guide plate
   n: a refractive index of the light guide plate.

3. The light unit for a display device as set forth in claim 2, wherein the color dispersion sheet has a sectional shape formed by repeatedly arranging a plurality of triangular projections at constant pitches.

4. The light unit for a display device as set forth in claim 3, wherein the pitch of the color dispersion sheet is in a range between 0.5 mm and 2.0 mm.

5. The light unit for a display device as set forth in claim 1, wherein the light enters and exits into and from the color dispersion sheet through the same surface thereof.

6. The light unit for a display device as set forth in claim 1, wherein the light enters and exits into and from the color dispersion sheet through different surfaces, respectively.

7. The light unit for a display device as set forth in claim 1, wherein the diffraction pattern is a hologram diffraction pattern obtained through a hologram exposure process.

8. The light unit for a display device as set forth in claim 1, further comprising an optical path correcting member located between the light source and light guide plate, the optical path correcting member being adapted to allow an optical path of the light entering the light guide plate to be inclined at a certain angle from the light guide plate and a horizontal plane.

9. The light unit for a display device as set forth in claim 1, wherein a refractive index of the color dispersion sheet is larger than 1.0 and smaller than 1.8.

10. The light unit for a display device as set forth in claim 1, wherein the color dispersion sheet is made of transparent synthetic resin.

11. The light unit for a display device as set forth in claim 1, wherein the color dispersion sheet is made of an optical medium having a refractive index of a flint series.

* * * * *